United States Patent
Strogov et al.

(10) Patent No.: US 12,299,120 B2
(45) Date of Patent: May 13, 2025

(54) SYSTEMS AND METHODS FOR PREVENTING HOLLOWING ATTACK

(71) Applicant: Acronis International GmbH, Shaffhausen (CH)

(72) Inventors: Vladimir Strogov, Singapore (SG); Aliaksei Dodz, Singapore (SG); Serg Bell, Singapore (SG); Stanislav Protasov, Singapore (SG)

(73) Assignee: Acronis International GmbH, Shaffhausen (CH)

( * ) Notice: Subject to any disclaimer, the term of this patent is extended or adjusted under 35 U.S.C. 154(b) by 274 days.

(21) Appl. No.: 17/936,400

(22) Filed: Sep. 29, 2022

(65) Prior Publication Data
US 2024/0111860 A1    Apr. 4, 2024

(51) Int. Cl.
*G06F 21/55*    (2013.01)

(52) U.S. Cl.
CPC ...... *G06F 21/554* (2013.01); *G06F 2221/034* (2013.01)

(58) Field of Classification Search
CPC . G06F 21/554; G06F 2221/034; G06F 21/566
See application file for complete search history.

(56) References Cited

U.S. PATENT DOCUMENTS

| | | | |
|---|---|---|---|
| 10,043,000 B2 * | 8/2018 | Kraemer | G06F 21/52 |
| 10,917,435 B2 | 2/2021 | Stupak et al. | |
| 11,055,411 B2 | 7/2021 | Strogov et al. | |
| 11,354,413 B2 | 6/2022 | Tumblin | |
| 11,636,214 B2 | 4/2023 | Ndu et al. | |
| 2017/0272462 A1 * | 9/2017 | Kraemer | G06F 21/52 |
| 2022/0222338 A1 * | 7/2022 | Gupta | G06F 21/554 |

FOREIGN PATENT DOCUMENTS

GB    2502774 A    12/2013

OTHER PUBLICATIONS

What is Cyber Security? Definition, Types, Examples—Acronis (Acronis Blog), https://www.acronis.com/en-sg/blog/posts/what-is-cyber-security/, Dec. 11, 2020.

* cited by examiner

*Primary Examiner* — Sarah Su
*Assistant Examiner* — Vladimir I Gavrilenko
(74) *Attorney, Agent, or Firm* — ESPE Legal Consultancy FZ-LLC

(57) ABSTRACT

System and method for detecting and curing a hollowing attack is disclosed herein. The method comprises monitoring real-time process memory parameters of a target process; retrieving real-time process memory parameters of the target process; comparing the real-time process memory parameters of the target process with reference process parameters of the target process stored in a system storage of the computing system and parameters of the process creation call-back notification; detecting a hollowing attack based on the comparison in previous step; in response to detecting the hollowing attack, determining a threat source file of malicious code; determining address space of the hollowed process on the computing system based on system log data; and curing the computing system by blocking execution of the threat source file and deleting threat resources associated therewith from the computing system.

20 Claims, 5 Drawing Sheets

SYSTEMS AND METHODS FOR PREVENTING HOLLOWING ATTACK

FIELD OF THE INVENTION

The present disclosure generally relates to the field of hollowing attack protection. In particular, the present disclosure relates to systems and methods of controlling application execution for preventing the hollowing attack.

BACKGROUND OF THE INVENTION

Process hollowing or hollow process injection is a technique in which a malicious code is injected into a memory of a computing system to replace an executable section of a legitimate process, thereby allowing blending malware into the system under the guise of a legitimate process. Attackers employ this technique to cause a legitimate process to execute a malicious code. One aspect of the hollow process injection technique is that the path of the process that was attacked still points to the legitimate path, and by executing within the context of the legitimate process, the malware has the ability of by-pass host intrusion prevention systems and firewalls.

In some operating systems, applications can be started in suspended mode. In such a suspended process, the write memory method can be used for replacing a legitimate executable section of the process with malicious software. When this process resumes operation, it starts working like a virus, while the verification systems allow it to work because it appears to be a legitimate process.

To detect such attacks, various request interception techniques are often used, in particular API interceptions, injections, and hooks. However, the problem with these solutions is the large number of false positives and compatibility with other applications, including data protection applications, which can sometimes use memory allocation techniques to control user actions with the application. These methods may further cause changes in operating system functions and object settings, which may result in an inoperable antivirus protection system.

There is a need for determining a process code substitution without using hooks that make changes to the controlled application.

SUMMARY OF THE INVENTION

The present disclosure envisages a system and method for detecting and curing a hollowing attack. Hollowing attacks are a kind of security exploit. In a typical hollowing attack, a hacker removes code in a trusted executable file and replaces it with malicious code. Such attacks can be used by attackers to cause a trusted legitimate process to execute a malicious code. The method comprises monitoring real-time process memory parameters of a target process by an OS memory manager of a computing system. Real-time process memory parameters of the target process are re-tried by the OS memory manager. The real-time process memory parameters of the target process are compared by a security application and security drivers with reference process parameters of the target process stored in a system storage of the computing system. A hollowing attack is detected by the security application and security drivers based on the comparison in the previous step. In response to detecting the hollowing attack, determining a threat source file of malicious code by the security application and security drivers. Address space of the threat source file on the computing system is determined by the security application and security drivers based on system log data. The computing system is cured by the security application and security drivers by blocking execution of the threat source file and deleting threat resources associated with them from the computing system.

In an alternative embodiment, the real-time process parameters of the target process include an identifier associated with an executable file of the target process. The identifier helps in retrieving the reference process parameters of the target process for the comparison.

In an alternative embodiment, the step of detecting the hollowing attack based on the comparison includes determining an instance of memory swapping. A portion of the target process memory is swapped with the threat source file, and the instance of memory swapping occurs when the target process is in suspended mode.

In an alternative embodiment, the step of monitoring the target process includes monitoring the target process for page fault exceptions for determining the address space of the target process where the instant of memory swap has occurred resulting in encroachment of the threat source file therein.

In an alternative embodiment, the method includes filtering from the reference process parameters of the target process library imports and non-executable memory spaces from the determined address space prior to the comparison with the real-time target process parameters.

In an alternative embodiment, the method includes monitoring the target process with an enhanced security policy profile by the security application and security drivers in response to detection of the hollowing attack.

In an alternative embodiment, the method includes monitoring the target process with a regular security policy profile in response to absence of the hollowing attack.

The present disclosure envisages a method for detecting and curing a hollowing attack. The method comprising retrieving, by an OS memory manager of a computing system, real-time process memory parameters of a target process; monitoring I/O activity of a computing system for anomalies, by a security application and security drivers, associated with the target process; in response to the I/O activity being within scope of anomaly, comparing, by the security application and security drivers, the real-time process memory parameters of the target process with reference process parameters of the target process stored in a system storage of the computing system; detecting, by the security application and security drivers of the computing system, a hollowing attack based on the comparison in previous step; in response to detecting the hollowing attack, determining, by the security application and security drivers, a threat source file of malicious code; determining, by the security application and security drivers, address space of the hollowed process on the computing system based on system log data; and curing, by the security application and security drivers, the computing system by blocking execution of the threat source file, deleting the threat source file and deleting associated threat resources from the computing system.

In an alternative embodiment, the real-time process parameters of the target process include an identifier associated with an executable file of the target process. The identifier helps in retrieving the reference process parameters of the target process for the comparison.

In an alternative embodiment, the step of detecting the hollowing attack based on the comparison includes determining an instance of memory swapping. A portion of the target process memory is swapped with the threat source file, and the instance of memory swapping occurs when the target process is in suspended mode.

In an alternative embodiment, the method includes monitoring the target process with an enhanced security policy profile by the security application and security drivers in response to detection of the hollowing attack.

In an alternative embodiment, the method includes monitoring the target process with a regular security policy profile in response to absence of the hollowing attack.

The present disclosure also envisages a system for detecting and curing a hollowing attack. The system comprises a system storage of a computing system for storing one or more files associated with a target process. An application execution module operates in user mode on the computing system and is configured to facilitate execution of the target process. A file system, operating in a kernel mode of the computing system, is configured to facilitate the creation of the target process once a user accesses an executable file of the target process. An OS memory manager operates in the kernel mode of the computing system and is configured to control and provide memory to the target process and retrieve real-time process memory parameters of the target process. A security application and security drivers operating in the user and kernel modes of the computing system are configured to compare the real-time process memory parameters of the target process with reference process parameters of the target process stored in the system storage; detect a hollowing attack based on the comparison; in response to detecting the hollowing attack, determine a threat source file of malicious code; determine address space of the hollowed process on the computing system based on system log data; and cure the computing system by blocking execution of the hollowed process and deleting threat resources associated therewith from the computing system.

In an alternative embodiment, the real-time process parameters of the target process include an identifier associated with the executable file of the target process. The identifier helps in retrieving the reference process parameters of the target process for the comparison.

In an alternative embodiment, the security application and security drivers are configured to determine an instance of memory swapping while detecting the hollowing attack. A portion of the target process memory is swapped with the threat source file, and the instance of memory swapping occurs when the target process is in suspended mode.

In an alternative embodiment, the OS memory manager is configured to monitor the target process for page fault exceptions for determining the address space of the target process where the instant of memory swap has occurred resulting in encroachment of the threat source file therein.

In an alternative embodiment, the security application and security drivers are configured to filter from the reference process parameters of the target process library imports and non-executable memory spaces from the determined address space prior to the comparison with the real-time target process parameters.

In an alternative embodiment, the security application and security drivers are configured to monitor the target process with an enhanced security policy profile in response to detection of the hollowing attack.

In an alternative embodiment, the security application and security drivers are configured to monitor the target process with a regular security policy profile in response to absence of the hollowing attack.

DETAILED DESCRIPTION

Figure 1:
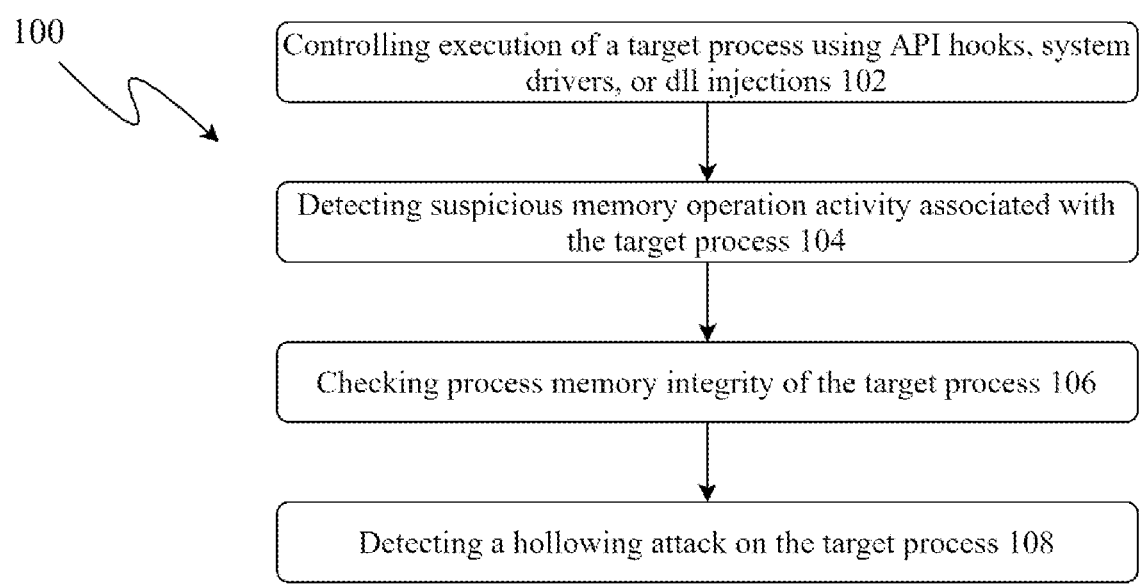
FIG. 1 shows a block diagram depicting a typical method for detecting a hollowing attack.

FIG. 1 shows a block diagram depicting method 100 for detecting a hollowing attack. At block 102, method 100 includes controlling execution of a target process using API hooks, system drivers, or dll (dynamic link library) injections. At block 104, the method 100 includes detecting suspicious memory operation activity associated with the target process. At block 106, the method 100 includes checking process memory integrity of the target process. At block 108, the method 100 includes detecting a hollowing attack on the target process.

The present disclosure envisages a system and method for detecting and curing a hollowing attack, which determines a process code substitution without using hooks that make changes to the controlled application.

In accordance with an embodiment of the present disclosure, a method for detecting and mitigating a hollowing attack includes monitoring a process memory of a target process on a computing system. In accordance with one embodiment, real-time process memory parameters of the target process are compared to reference process memory parameters that are stored within a system storage of the computing system. In one embodiment, the real-time process memory parameters include an identifier that associates the real-time process memory parameters with the reference process memory parameters, which helps in retrieval of the reference process memory parameters from system storage libraries. The method then includes comparing the real-time process memory parameters with the reference process memory parameters of the target process for the purpose of detecting if any portion of the real-time process memory parameters have been modified or swapped with a malicious code. Once a threat is detected, the method includes using a security application and security drivers for curing the computing system of all threats associated with the target process.

In another embodiment, the method can include the usage of two hooks. The hooks are not related to application operation control. Instead, the two hooks include a first hook for detecting a start of the target process in suspended mode, and a second hook for detecting resume execution by an API. An advantageous aspect of such a feature of the method is that by using the first hook and the second hook, the memory scanning process can be optimized by filtering only suspicious applications that have been started in suspended mode.

Figure 2:
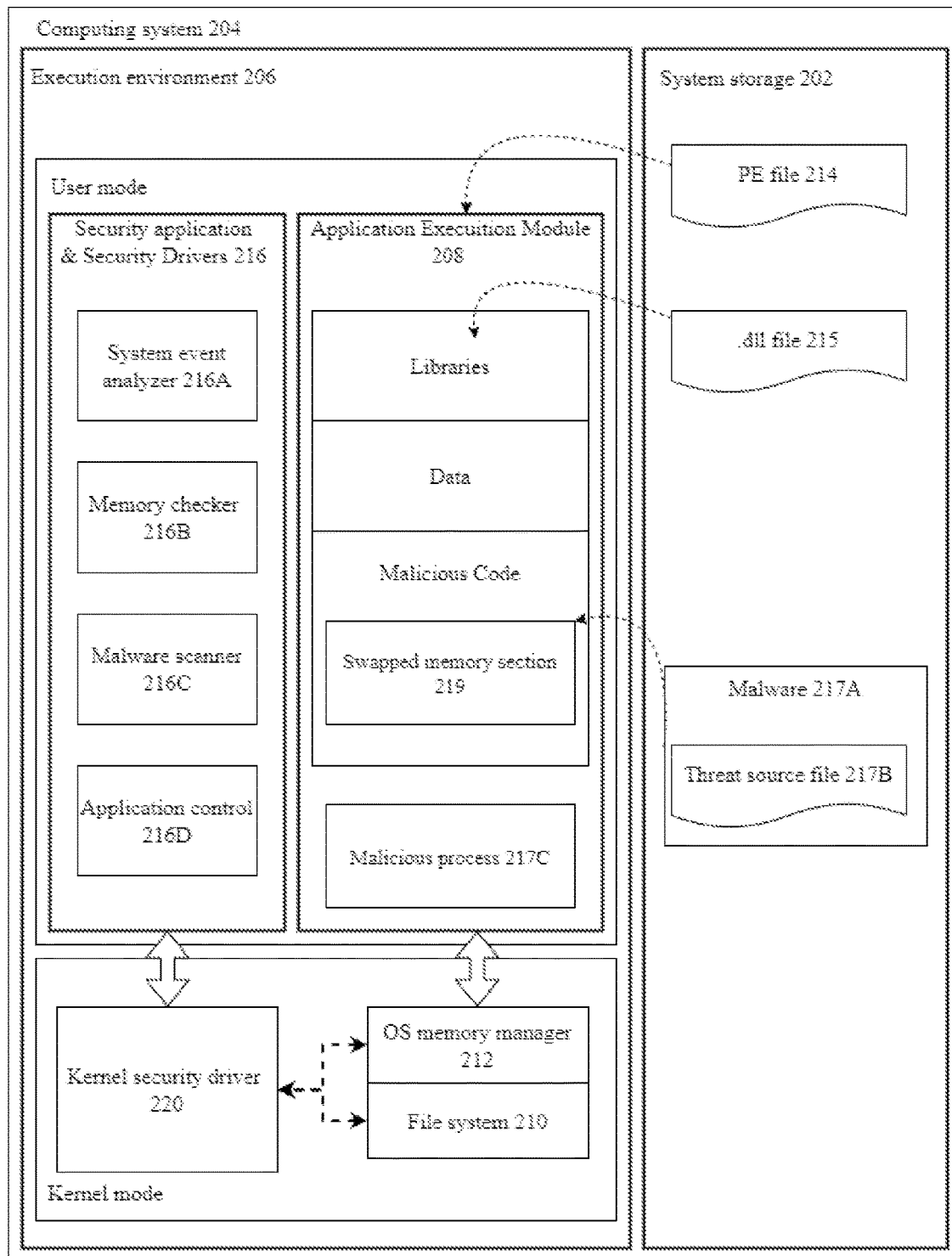
FIG. 2 shows a block diagram of a system for detecting and curing a hollowing attack, in accordance with an embodiment of the present disclosure.

FIG. 2 shows a block diagram of a system for detecting and curing a hollowing attack (hereinafter referred to as system 200), in accordance with an embodiment of the present disclosure. Referring to FIG. 2, the system 200 comprises a system storage 202 of a computing system 204 for storing one or more files associated with a target process. In an execution environment 206 of the computing system 204, the system 200 includes an application execution module 208 operating in user mode and configured to facilitate execution of the target process. More specifically, a user executes an executable file in the user mode of the computing system 204, which leads to the creation of the target process by a file system 210 of the computing system 204. More specifically, the file system 210 operates in a kernel mode of the computing system 204 and is configured to facilitate the creation of the target process once a user accesses the executable file of the target process in the user mode.

The system 200 further comprises an OS memory manager 212 that operates in the kernel mode of the computing system 204 and is configured to monitor real-time process memory parameters of the target process. As seen in FIG. 2, once the user accesses a Portable Executable file 214 (hereinafter referred to as PE file 214), the application execution module 208 executes the PE file 214, thereby facilitating generation of the target process by the file system 210. Once the target process is generated, the OS memory manager 212 monitors and retrieves the real-time process parameters of the target process. In case of a hollowing attack, a malware 217C causes the launch of the target process in suspended mode. After the target process starts in suspended mode, the malicious process 217C causes a memory swap in a swapped memory section 219 of the application execution module 208 from the threat source file 217B that is a part of malware 217 file or is a separate file stored on the system storage 202. A part of the code or all process images of the target process is replaced with a malicious code by a threat source file 217B, thus creating a hollowed process. When the process is created, the callback notification is generated that contains address space information, source file address and other data that is used by the system to determine the relationship between the memory swap and source files.

The system 200 further comprises a security application and security drivers 216 operating in the user mode of the computing system 204. The security application and security drivers 216 is configured to compare the real-time process memory parameters of the target process with reference process parameters of the target process stored in the system storage. In an embodiment, a system event analyzer 216A of the security application and security drivers 216 performs the comparison. As seen in FIG. 2, the reference process memory parameters can be retrieved from the system storage 202 in the form of .dll files 215. The security application and security drivers 216 is configured to compare the real-time process memory parameters of the target process with the reference process memory parameters fetched from the system storage 202. The security application and security drivers 216 is further configured to detect a hollowing attack based on the comparison of the real-time process memory parameters of the reference process memory parameters associated with the target process. In one embodiment, a memory checker 216B of the security application and security drivers 216 performs the detection of the hollowing attack. In an embodiment, the real-time process parameters of the target process include an identifier associated with the executable file of the target process, wherein the identifier helps in retrieving the reference process parameters of the target process for the comparison.

In response to detection of the hollowing attack, the security application and security drivers 216 is further configured to determine a threat source file of malicious code and address space of the hollowed process and origin of the threat source file 217B on the computing system 204 based on system log data. System log data in different embodiments can represent a security application log file, operating system event log or journal, external system events database, STEM system or log management system. A malware scanner 216C of the security application and security drivers 216 detects the type of malware for executing the hollowing attack. Lastly, the security application and security drivers 216 is configured to cure the computing system 204 by blocking execution of the threat source file and deleting threat resources associated therewith from the computing system. An application control module 216D of the security application and security drivers 216 performs the function of curing the computing system 204. It is to be noted that the security application and security drivers 216 communicates with kernel security drivers 220 for performing the aforementioned operational steps.

In an embodiment, the OS memory manager 212 is configured to monitor the target process for page fault exceptions for determining the address space of the hollowed target process where the instant of memory swap has occurred resulting in encroachment of the threat source file therein. In an embodiment, the security application and security drivers 216 is configured to filter from the reference process parameters of the target process library imports and non-executable memory spaces from the determined address space prior to the comparison with the real-time target process parameters.

The security application and security drivers 216 is configured to determine an instance of memory swapping while detecting the hollowing attack. A portion of the target process memory is swapped with the threat source file, and the instance of memory swapping occurs when the target process is in suspended mode. As seen in FIG. 2, a hollowing attack is depicted where a threat source file 217B having the malicious code swaps with a swapped memory section 219 of the target process. Such an instance can occur when the target process is in suspended mode.

The security application and security drivers 216 are configured to monitor the target process with an enhanced security policy profile in response to detection of the hollowing attack. Alternatively, the security application and security drivers 216 is configured to monitor the target process with a regular security policy profile in response to absence of the hollowing attack. In an embodiment, the enhanced security policy profile can include monitoring of all application operations. In another embodiment, the enhanced security policy profile can additionally contain setting on process-specific heuristic rules. More specifically, for a signed process, heuristics for ransomware detection are enabled.

Figure 3:
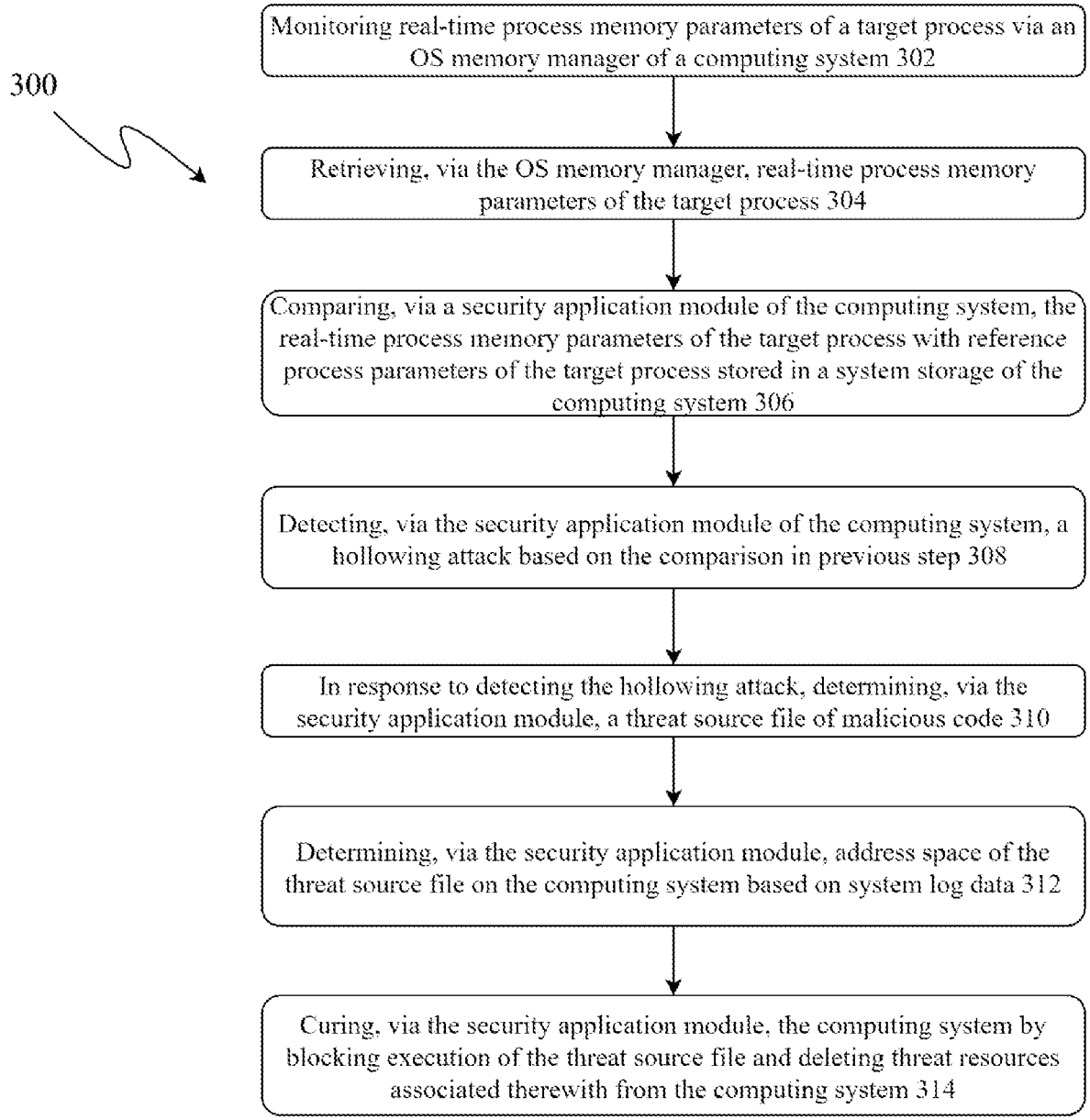
FIG. 3 shows a block diagram of a method for detecting and curing a hollowing attack, in accordance with an embodiment of the present disclosure.

FIG. 3 shows a block diagram of a method for detecting and curing a hollowing attack 300 (hereinafter referred to as method 300), in accordance with an embodiment of the present disclosure. The order in which the method 300 is described is not intended to be construed as a limitation, and any number of the described method blocks can be combined in any order to implement the method or similar alternative methods.

At block 302, the method 300 comprises monitoring real-time process memory parameters of a target process by an OS memory manager 212 of a computing system 204. The target process is a process that a user executes in a user mode of the computing system 204 by, for example, accessing an executable file of a program.

At block 304, the method 300 comprises retrieving, by the OS memory manager 212, real-time process memory parameters of the target process. Once the executable file of the required program is executed and the target process is created by a file system 210 of the computing system 204, the OS memory manager 212 retrieves the real-time process memory parameters of the target process for further scrutiny.

At block 306, the method 300 comprises comparing, by a security application and security drivers 216 of the computing system, the real-time process memory parameters of the target process with reference process parameters of the target process stored in a system storage 202 of the computing system 204. In an embodiment, the real-time process memory parameters of the target process include an identifier associated with an executable file of the target process. The identifier helps in retrieving the reference process memory parameters of the target process for the comparison.

At block 308, the method 300 comprises detecting, by the security application and security drivers 216 of the computing system 204, a hollowing attack based on the comparison in previous step. More specifically, the real-time process memory parameters of the target process and the reference process parameters of the target process have to be identical to indicate absence of a hollowing attack. Discrepancy in the real-time process memory parameters of the target process and the reference process parameters of the target process indicates that the executable file of the target process was tampered. In an embodiment, the step of detecting the hollowing attack based on the comparison includes determining an instance of memory swapping. A portion of the target process memory is swapped with the threat source file, and the instance of memory swapping occurs when the target process is started in suspended mode.

At block 310, the method 300 comprises in response to detecting the hollowing attack, determining, by the security application and security drivers 216, a threat source file of malicious code. More specifically, once the hollowing attack is detected, a malware scanner 216B of the security application and security drivers 216 identifies the type of malware to address the threat associated therewith.

At block 312, the method 300 includes determining, by the security application and security drivers 216, address space of the hollowed process on the computing system based on system log data.

At block 314, the method 300 includes curing, by the security application and security drivers 216, the computing system by blocking execution of the threat source file and deleting threat resources associated therewith from the computing system 204.

In an embodiment, the method 300 further includes filtering from the reference process parameters of the target process library imports and non-executable memory spaces from the determined address space prior to the comparison with the real-time target process parameters for ensuring optimal usage of computing resources. In one embodiment, the method 300 can include the usage of two hooks. The hooks are not related to application operation control. Instead, the two hooks include a first hook for detecting a start of the target process in suspended mode, and a second hook for detecting resume execution by an API. An advantageous aspect of such a feature of method 300 is that by using the first hook and the second hook, the memory scanning process can be optimized by filtering only suspicious applications that are running in suspended mode.

Figure 4:
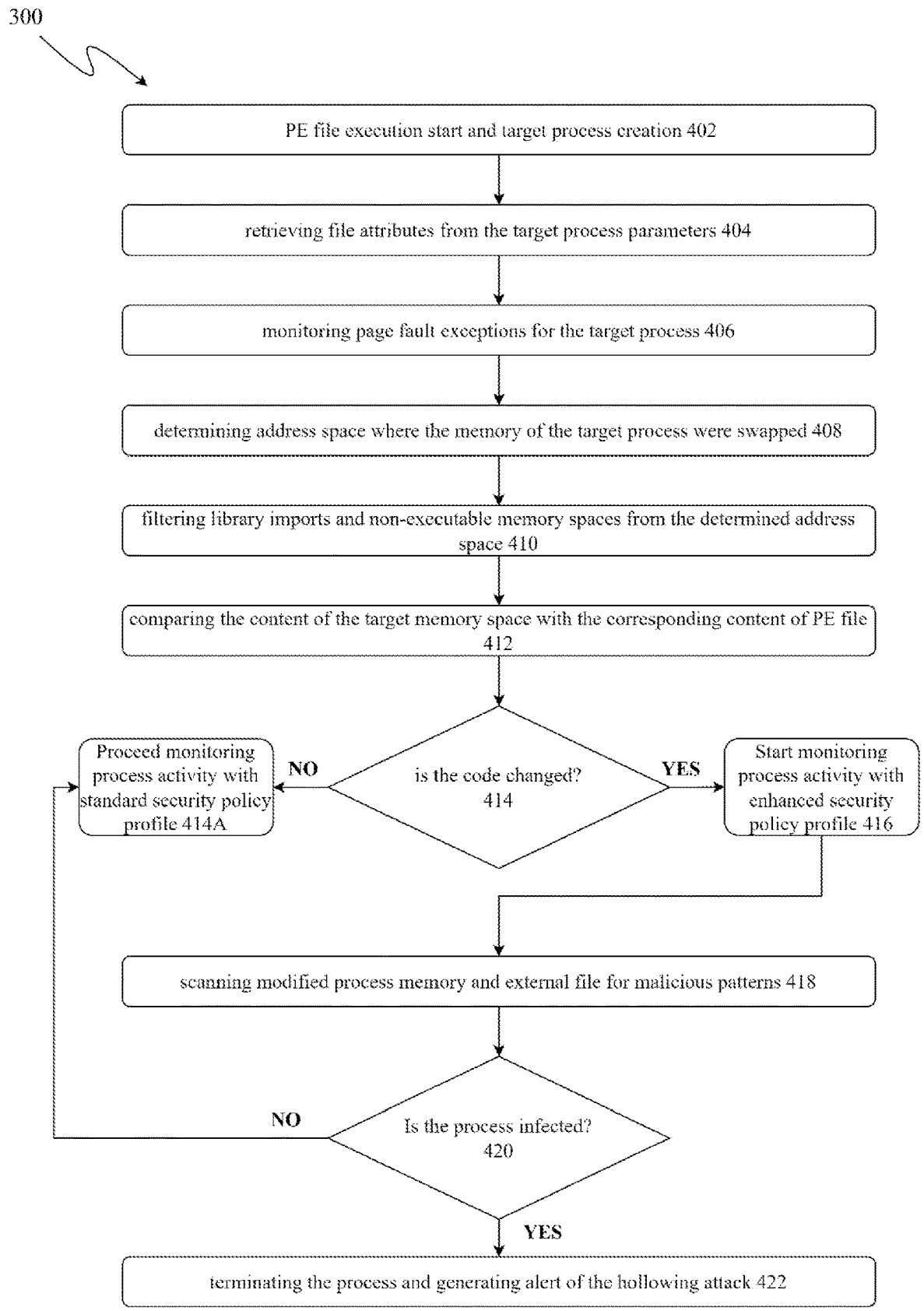
FIG. 4 shows a block diagram of an exemplary implementation of the method for detecting and curing a hollowing attack, in accordance with an embodiment of the present disclosure.

FIG. 4 shows a block diagram of an exemplary implementation 400 of the method for detecting and curing a hollowing attack, in accordance with an embodiment of the present disclosure. At block 402, the implementation 400 includes execution of the PE file 214 and creation of the target process. As mentioned previously, the creation of the target process is facilitated by the file system 210.

At block 404, the implementation 400 includes retrieving file attributes from the process parameters. The file attributes are the real-time process memory parameters of the target process. In one embodiment, the real-time process memory parameters are retrieved by the OS memory manager 212 once the target process is created.

At block 406, the implementation 400 includes monitoring page fault exceptions for the target process with the help of the kernel security driver. In one embodiment, the monitoring is performed by the OS memory manager 212. Such monitoring also allows the detection of an instance of a memory swapping.

At block 408, the implementation 400 includes determining address space where the memory of the target process was swapped. The OS memory manager 212 determines the address space where the instance of memory swapping has occurred.

At block 410, the implementation 400 includes filtering library imports and non-executable memory spaces from the determined address space. In one embodiment, such a filtering can be performed by the security application and security drivers 216. Such filtering eliminates the unnecessary and unrequired comparison or analysis between the real-time process memory parameters and the reference process memory parameters.

At block 412, the implementation 400 includes comparing the content of the target memory space with the corresponding content of the PE file. In one embodiment, such a comparison is made by the security application and security drivers 216.

At block 414, the implementation 400 includes determining if the code has changed, i.e., if the target memory space has been tampered with. Such a determination is performed by the security application and security drivers 216.

At block 414A, the implementation 400 includes monitoring the target process activity with standard security policy profile in response to determining that the code of the target process has not been modified.

At block 416, the implementation 400 includes monitoring process activity with enhanced security policy profile, in response to detection of the instance of change in code of the target process.

At block 418, the implementation 400 includes scanning modified target process memory and external files for malicious patterns. Such scanning is performed by the security application and security drivers 216.

At block 420, the implementation 400 includes determining if the modified target process is infected. Such a determination is performed by the security application and security drivers 216. If the modified target process is not infected, the implementation returns to block 414A, where the target process is continually monitored using standard security policy profile. There are examples of zero-day attacks that use techniques, when the memory of the process is modified, but the threat couldn't be detected during scanning or code comparing process, because this threat is very new—for such cases the standard security policy will cover the risk of malfunction.

At block 422, the implementation 400 includes terminating the process and generating an alert of the hollowing attack in response to detection of infection by the security application and security drivers 216. The process step of terminating the target process is performed by the security application and security drivers 216 to prevent the execution of the malicious code on the host computing system. In one embodiment, the security application and security drivers 216 also terminates or deletes all other threat resources attached to the infected target process.

Figure 5:
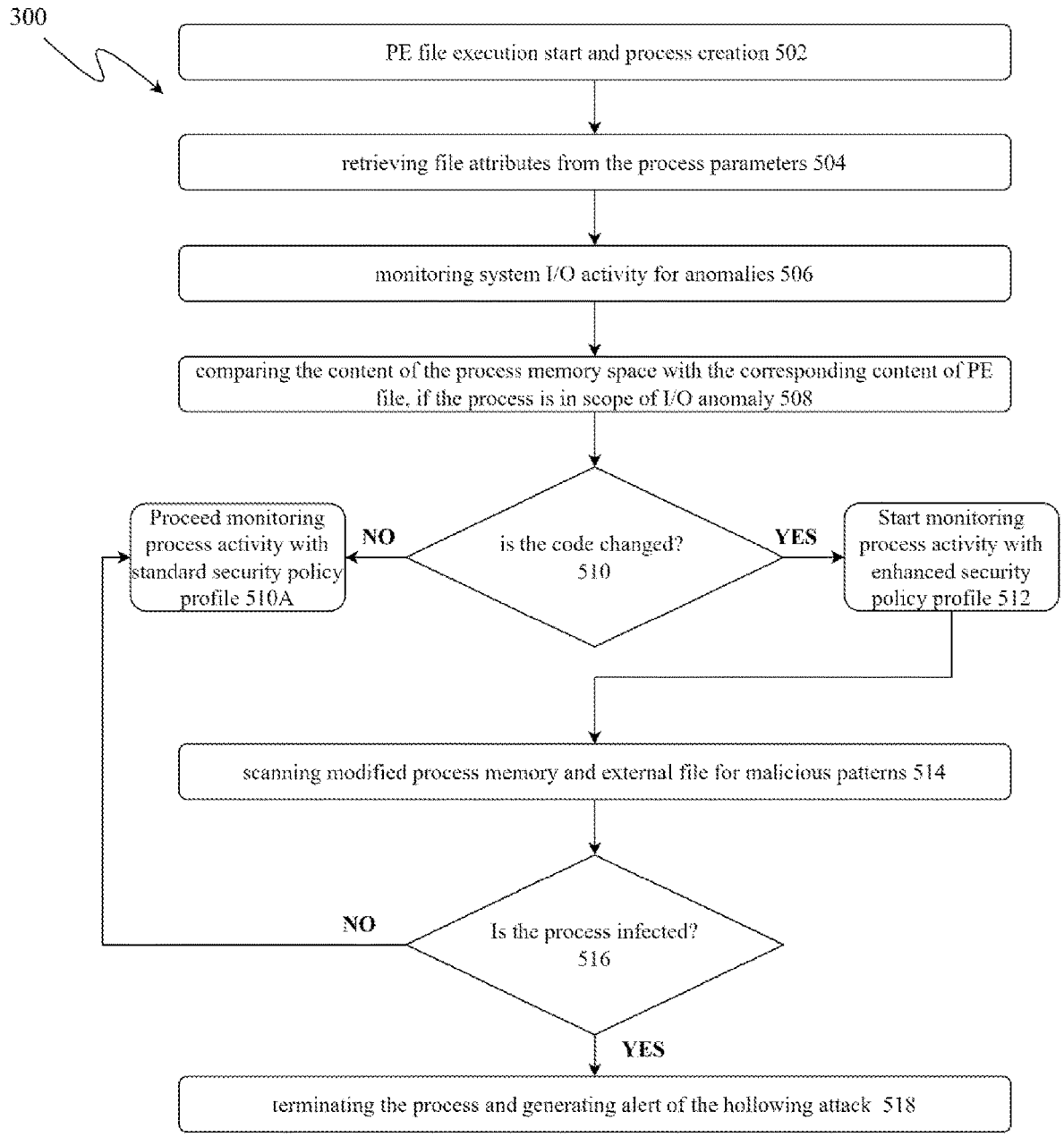
FIG. 5 shows a block diagram of another exemplary implementation of the method for detecting and curing a hollowing attack, in accordance with an embodiment of the present disclosure.

FIG. 5 shows a block diagram of another exemplary implementation 500 of the method for detecting and curing a hollowing attack, in accordance with an embodiment of the present disclosure. At block 502, the implementation 500 includes execution of the PE file 214 and creation of the target process. As mentioned previously, the creation of the target process is facilitated by the file system 210.

At block 504, the implementation 500 includes retrieving file attributes from the process parameters. file attributes are the real-time process memory parameters of the target process. In one embodiment, the real-time process memory parameters are retrieved by the OS memory manager 212 once the target process is created.

At block 506, the implementation 500 includes monitoring system I/O activity, associated with the target process, for anomalies. In accordance with the present implementation, such monitoring can be performed by the security application and security drivers 216.

At block 508, the implementation 500 includes comparing the content of the process memory space with the corresponding content of the PE file, if the process is in scope of I/O anomaly. In accordance with the present implementation, such comparison can be performed by the security application and security drivers 216.

At block 510, the implementation 500 includes determining if the code has changed, i.e., if the target memory space has been tampered with. Such a determination is performed by the security application and security drivers 216.

At block 510A, the implementation 500 includes monitoring the target process activity with standard security policy profile in response to determining that the code of the target process has not been modified.

At block 512, the implementation 500 includes monitoring process activity with enhanced security policy profile, in response to detection of the instance of change in code of the target process.

At block 514, the implementation 500 includes scanning modified target process memory and external files for malicious patterns. Such scanning is performed by the security application and security drivers 216.

At block 516, the implementation 500 includes determining if the modified target process is infected. Such a determination is performed by the security application and security drivers 216. If the modified target process is not infected, the implementation returns to block 414A, where the target process is continually monitored using standard security policy profile.

At block 518, the implementation 500 includes terminating the process and generating an alert of the hollowing attack in response to detection of infection by the security application and security drivers 216. The process step of terminating the target process is performed by the security application and security drivers 216 to prevent the execution of the malicious code on the host computing system. In one embodiment, the security application and security drivers 216 also terminates or deletes all other threat resources attached to the infected target process.

An advantageous aspect of the system and method for detecting and curing a hollowing attack, in accordance with the present disclosure is the pro-active nature thereof. More specifically, unlike the conventional systems, where a curing action is only taken after the execution of malicious code on the host computing system, the system and method of the present disclosure facilitate inspection of a desired target process immediately after execution of an executable file of the target process for checking if the created target process includes any malicious code. If a malicious code is detected, the execution of the target process is blocked, and the target process is terminated.

The invention claimed is:

1. A method for detecting a hollowing attack in a computing system, the method comprising:
    monitoring a real-time process memory parameter of a target process by an operating system (OS) memory manager of the computing system, the real-time process memory parameter defining an actual memory value of the target process while the target process is executing in user mode on the computing system;
    retrieving, by the OS memory manager, the real-time process memory parameter of the target process;
    comparing, by a security application and a security driver of the computing system, the real-time process memory parameter of the target process with a reference process parameter of the target process stored in a system storage of the computing system, the reference process parameter of the target process defining an expected memory value of the target process when the target process is executing in user mode on the computing system;
    detecting, by the security application and the security driver of the computing system, a hollowing attack based on the comparison of the real-time process memory parameter with the reference process parameter when a discrepancy exists between the actual memory value of the target process while the target process is executing and the expected memory value of the target process when the target process is executing, wherein the hollowing attack comprises malicious code in a trusted executable file;
    determining, by the security application and the security driver a threat source file of the malicious code associated with the hollowing attack, the threat source file comprising a file stored in system storage from which the malicious code originated on the computing system;
    determining, by the security application and the security driver, an address space of a hollowed process on the computing system based on system log data, the address space comprising a space in memory;
    blocking, by the security application and the security driver, execution of the hollowed process; and
    deleting the threat source file and a resource associated with the threat source file from the computing system.

2. The method according to claim 1, wherein the real-time process parameter of the target process comprises an identifier associated with an executable file of the target process, and wherein the identifier is used for retrieving the reference process parameter of the target process for the comparison.

3. The method according to claim 1, wherein the step of detecting the hollowing attack based on the comparison further comprises determining an instance of memory swapping, wherein a portion of the target process memory is swapped with the threat source file, and wherein the instance of memory swapping occurs when the target process is in a suspended mode.

4. The method according to claim 3, wherein the step of monitoring the target process includes monitoring the target process for page fault exceptions for determining the address space of the target process where the instant of memory swap has occurred resulting in encroachment of the source file of the malicious code.

5. The method according to claim 4, further comprising the step of filtering from the reference process parameters of the target process library imports and non-executable memory spaces from the determined address space prior to the comparison with the real-time target process parameters.

6. The method according to claim 1, further comprising the step of monitoring the target process with an enhanced security policy profile by the security application and the security driver in response to detection of the hollowing attack, wherein the enhanced security profile policy comprises monitoring all application operations.

7. The method according to claim 6, further comprising the step of monitoring the target process with a regular security policy profile if a hollowing attack is not detected, wherein the regular security policy profile comprises monitoring less than all application operations.

8. A method for detecting and curing a hollowing attack in a computing system, the method comprising:
   retrieving, by an operating system (OS) memory manager of the computing system, real-time process memory parameters of a target process, the real-time process memory parameter defining an actual memory value of the target process while the target process is executing in user mode on the computing system;
   monitoring Input/Output activity of the computing system for an anomaly, by a security application and a security driver, associated with the target process;
   comparing, by the security application and the security driver, the real-time process memory parameter of the target process with a reference process parameter of the target process stored in a system storage of the computing system in response to the Input/Output activity being within scope of the anomaly, the reference process parameter of the target process defining an expected memory value of the target process when the target process is executing in user mode on the computing system;
   detecting, by a security application and security drivers of the computing system, a hollowing attack based on the comparison of the real-time process memory parameter with the reference process parameter when a discrepancy exists between the actual memory value of the target process while the target process is executing and the expected memory value of the target process when the target process is executing, wherein the hollowing attack comprises malicious code in a trusted executable file;
   determining, by the security application and the security driver, a threat source file of the malicious code in associating with the hollowing attack, the threat source file comprising a file stored in system storage from which the malicious code originated on the computing system;
   determining, by the security application and the security driver, an address space of the hollowed process on the computing system based on system log data, the address space comprising a space in memory;
   blocking, by the security application and the security driver, execution of the hollowed process; and
   deleting the threat source file and a resource associated with the threat source file from the computing system.

9. The method according to claim 8, wherein the real-time process parameter of the target process comprises an identifier associated with an executable file of the target process, and wherein the identifier is used for retrieving the reference process parameters of the target process for the comparison.

10. The method according to claim 8, wherein the step of detecting the hollowing attack based on the comparison further comprises determining an instance of memory swapping, wherein a portion of the target process memory is swapped with the threat source file, and wherein the instance of memory swapping occurs when the target process is in suspended mode.

11. The method according to claim 8, further comprising the step of monitoring the target process with an enhanced security policy profile by the security application and the security driver in response to detection of the hollowing attack, wherein the enhanced security profile policy comprises monitoring all application operations.

12. The method according to claim 11, further comprising the step of monitoring the target process with a regular security policy profile if a hollowing attack is not detected, wherein the regular security policy profile comprises monitoring less than all application operations.

13. A system for detecting and curing a hollowing attack in a computing system, the system comprising:
   a microprocessor coupled with a nonvolatile system storage of the computing system for storing one or more files associated with a target process;
   an application execution module, under program control of the microprocessor, operating in a user mode on the computing system, wherein the application execution module is configured to execute the target process;
   a file system operating in a kernel mode of the computing system, the file system configured to facilitate the creation of the target process when an executable file of the target process is accessed;
   an operating system (OS) memory manager operating in the kernel mode of the computing system, wherein the OS memory manager is configured to:
      monitor a real-time process memory parameter of the target process, the real-time process memory parameter defining an actual memory value of the target process while the target process is executing in user mode on the computing system; and
      retrieve the real-time process memory parameter of the target process;
   a security application and a security driver operating in the user mode of the computing system, wherein the security application and the security drivers are configured to:
      compare the real-time process memory parameter of the target process with a reference process parameter of the target process stored in the system storage, the reference process parameter of the target process defining an expected memory value of the target process when the target process is executing in user mode on the computing system;
      detect a hollowing attack based on the comparison when a discrepancy exists between the actual memory value of the target process while the target process is executing and the expected memory value of the target process when the target process is executing, wherein the hollowing attack comprises malicious code in a trusted executable file;
      in response to detecting the hollowing attack, determine a source file of the malicious code, the source file of the malicious code comprising a file stored in system storage from which the malicious code originated on the computing system;
      determine an address space of the hollowed process on the computing system based on system log data, the address space comprising a space in memory; and block execution of the hollowed process and delete the source file of the malicious code and a resource associated with the threat source file from the computing system.

14. The system according to claim 13, wherein the real-time process parameter of the target process comprises an identifier associated with the executable file of the target process, wherein the identifier is used for retrieving the reference process parameters of the target process for the comparison.

15. The system according to claim 13, wherein the security application and the security driver are configured to determine an instance of memory swapping while detecting the hollowing attack, wherein a portion of the target process memory is swapped with the threat source file, and wherein the instance of memory swapping occurs when the target process is in suspended mode.

16. The system according to claim 15, wherein the OS memory manager is configured to monitor the target process for page fault exceptions for determining the address space of the target process where the instant of memory swap has occurred resulting in encroachment of the source file of the malicious code.

17. The system according to claim 16, wherein the security application and the security driver are configured to filter, from the reference process parameter of the target process, a library import and a non-executable memory space from the determined address space prior to the comparison with the real-time target process parameter.

18. The system according to claim 13, wherein the security application and the security driver are configured to monitor the target process with an enhanced security policy profile in response to detection of the hollowing attack, wherein the enhanced security profile policy comprises monitoring all application operations.

19. The system according to claim 18, wherein the security application and security drivers are configured to monitor the target process with a regular security policy profile if a hollowing attack is not detected, wherein the regular security policy profile comprises monitoring less than all application operations.

20. The system according to claim 18, wherein the enhanced security profile further comprises process-specific heuristic rules.

\* \* \* \* \*